June 13, 1961    H. J. SCHMITZ, JR., ET AL    2,988,041
INDICATING SYSTEM FOR A THERMOMETER OR THE LIKE
Filed Aug. 10, 1959    2 Sheets-Sheet 2

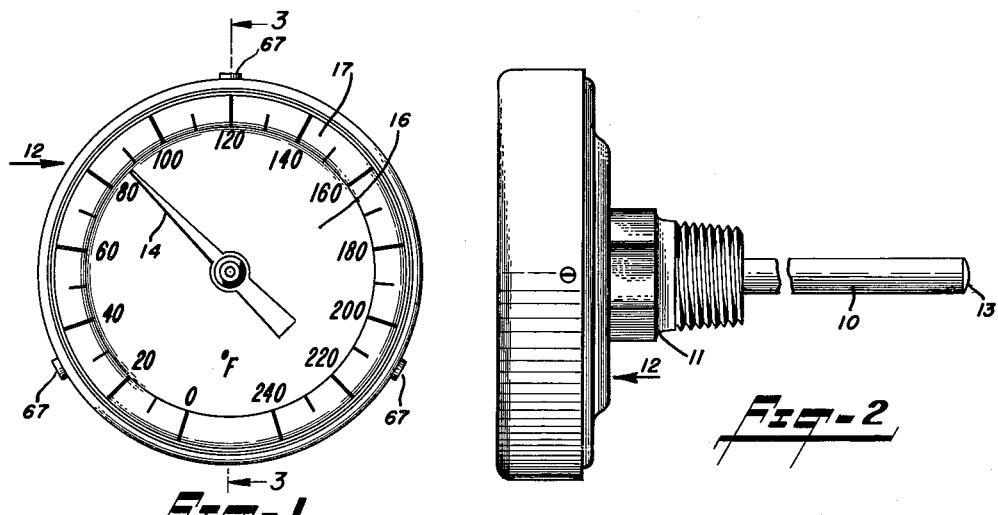
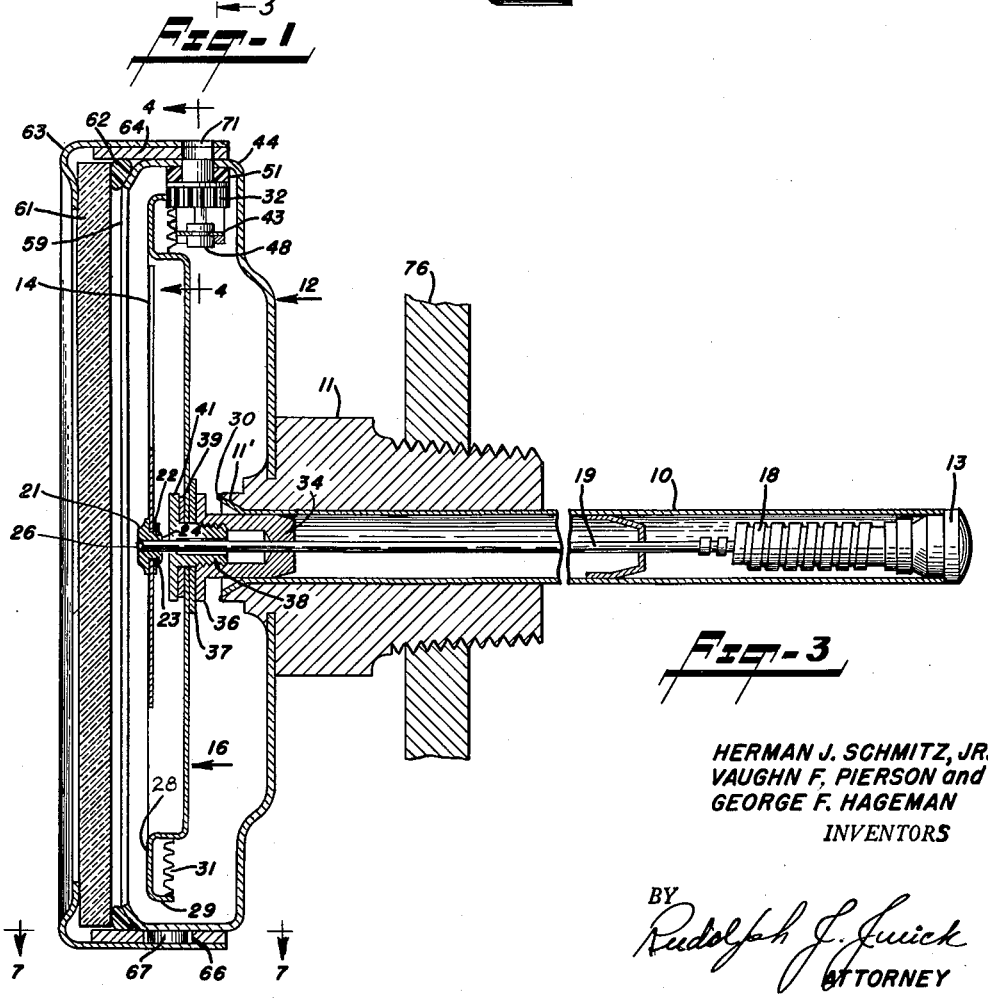

HERMAN J. SCHMITZ, JR.
VAUGHN F. PIERSON and
GEORGE F. HAGEMAN
INVENTORS

BY
Rudolph J. Junick
ATTORNEY

United States Patent Office
2,988,041
Patented June 13, 1961

2,988,041
INDICATING SYSTEM FOR A THERMOMETER OR THE LIKE
Herman J. Schmitz, Jr., Mountainside, Vaughn F. Pierson, Morristown, and George F. Hageman, Union, N.J., assignors to Daystrom, Incorporated, Murray Hill, N.J., a corporation of New Jersey
Filed Aug. 10, 1959, Ser. No. 832,525
2 Claims. (Cl. 116—129)

This invention relates to condition responsive indicating instruments such as bimetallic thermometers, and the like, and particularly to a novel rotatable scale and mounting arrangement for use therein.

Although the rotatable scale and mounting arrangement of this invention is of general utility in indicating instruments, the arrangement is described with specific reference to a bimetallic thermometer. The novel bimetallic thermometer construction comprises bimetallic helical strip means within a tubular stem terminating in a head, or casing. One end of the helix or helices is anchored to the stem and the other end is secured to a staff having a pointer mounted thereon for movement over a suitably calibrated scale to provide a direct indication of the temperature affecting the bimetallic element. The scale plate and pointer are located within the head, or casing, mounted at the end of the stem. Such thermometers are subject to errors and inaccuracies in the temperature indication as a result of vibration, shock, and "aging" of the bimetallic element. Many prior art bimetallic thermometers include no means for correcting or eliminating such errors, and in those prior art thermometers which do include correcting means, the arrangement is generally complicated, bulky and/or virtually inaccessible once the thermometers have been installed.

In a conventional thermometer designed for threaded mounting in a wall, or separate socket, a threaded mounting nut is secured to the instrument head or casing. When the mounting nut is fully threaded into the wall hole or socket, the instrument scale may not be disposed in a desired reading position. Various arrangements have been included in prior art thermometers to permit rotation of the thermometer head to a desired orientation after the instrument has been mounted firmly in position. Generally, such arrangements have been unsatisfactory for one or more reasons.

In the instrument of this invention the scale plate, upon which the graduated scale markings are included, is formed with gear teeth on the periphery thereof which cooperate with a pinion gear mounted on the edge of the casing. The pinion gear is readily accessible from the edge of the instrument even after final installation of the instrument whereby the instrument may be easily and simply calibrated even when mounted in position. Further, during the installation of the instrument when the threaded mounting nut is fully threaded into the wall hole or socket, the instrument scale plate is easily rotated into a desired reading position by rotation of the above-described pinion gear. In the construction of the instrument, the pointer is frictionally secured to the staff. Therefore, at the initial installation of the thermometer, after the scale plate has been rotated to the desired reading position, the pointer is rotated relative to the staff to the correct temperature indication thereby completing the installation.

An object of this invention is the provision of an instrument having a graduated scale plate and pointer movable thereover, which scale plate is rotatably adjustable for calibration purposes.

An object of this invention is the provision of a non-protruding adjusting mechanism for rotatably adjusting the scale plate of a bimetallic thermometer from outside the thermometer case.

An object of this invention is the provision of a condition responsive indicating instrument which includes a staff rotatable in response to the condition to be measured, a pointer frictionally mounted on the said staff, a scale plate over which the pointer may pass, and means for rotatably adjusting the scale plate through 360 degrees of rotation.

An object of this invention is the provision of a scale plate, the said scale plate having gear teeth formed about the periphery thereof, a pinion gear engaging the gear teeth on the scale plate and supported by the thermometer casing, and means for rotating the pinion gear from the side of the said casing.

These and other objects and advantages will become apparent from the following description when taken with the accompanying drawings. It will be understood that drawings are for purposes of illustration and are not to be construed as defining the scope or limits of the invention, reference being had for the latter purpose to the appended claims.

In the drawings, wherein like reference characters denote like parts in the several views:

FIGURE 1 is a front view of a bimetallic thermometer embodying this invention, with the cover and clamping ring removed therefrom;

FIGURE 2 is a side elevational view of the device shown in FIGURE 1, and including also the cover and clamping ring;

FIGURE 3 is an enlarged central or axial cross-sectional view of the device, as on the line 3—3 of FIGURE 1 in the direction of the arrows, with parts in elevation;

Figure 4:
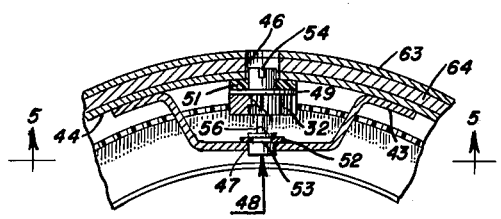
FIGURE 4 is a sectional view taken on line 4—4 of FIGURE 3 and showing the mounting arrangement for the pinion gear.

Referring, now, to FIGURES 1 and 2 of the drawings, the thermometer shown therein comprises a tubular stem 10 fixedly attached to a threaded mounting nut 11. A head, or casing, designated generally by the reference numeral 12, is also fixedly secured to the said mounting nut. The lower end of the stem 10 is closed by a plug 13 that is force-fitted into the stem. A pointer 14 is rotatable relative to a scale plate 16 which carries a set of temperature graduations 17.

Reference is now also made to FIGURE 3 of the drawings wherein there is shown a helical bimetallic coil 18 having one end secured to the plug 13. The other end of the bimetallic element is fastened to a staff 19 which extends into the head 12; the pointer 14 being connected to the upper or other end of the staff. The connecting means between the pointer 14 and staff 19 includes a hub 21 which is press fitted on the staff 19. The hub is provided with a radial flange around its periphery against which the pointer 14 is biased by means of a spring washer 22. A flat retaining washer 23 abuts the spring washer, and the pointer and spring and flat washers are retained on the hub 21 by spinning, or turning, the end of the hub over as indicated at 24. It will be understood that the spring washer is in a state of compression to thereby frictionally hold the pointer against inadvertent rotation. A slot, or kerf, 26 is formed in the upper face of the hub and through the end of the staff. It will be understood that the pointer 14 may be angularly adjusted relative to the hub 21 and attached staff 19 by inserting a screwdriver in the kerf 26, and turning the hub with the screwdriver while holding the pointer stationary, or vice versa.

The scale plate, or dial member, 16 is of a cup-shape and includes a radial flange 28 about its periphery at the open end thereof, and a rearwardly extending flange 29 at the periphery of the flange 28. The free edge of the generally cylindrical flange 29 is provided with gear teeth 31 suitably formed thereon and which are in cooperative engagement with a pinion gear 32; the scale plate 16 being rotated about the axis of the staff 19 upon rotation of the pinion gear.

Before describing the novel mounting arrangement for the pinion gear 32, the rotatable support for the scale plate 16 will first be described in detail. As seen in FIGURE 3, the scale plate mounting includes a flanged bottom bushing 34 which is force-fitted into the tubular stem 10, the stem being fixedly secured to the mounting nut 11 as by welding 30 at the flanged end 11'. A radial, outwardly extending flange 36 is formed a short distance from the upper end of the bottom bushing 34 for support of a spring washer 37 thereon. A flanged top bushing 38 threadedly engages the bottom bushing 34. The spring washer 37, scale plate 16 and a flat washer 39 are disposed between the lower bushing flange 36 and the flange 41 formed on the top bushing. The top bushing is turned into the bottom bushing a sufficient distance to compress the spring washer 37 to thereby frictionally hold the scale plate 16 against inadvertent rotation.

The means for rotating the scale plate 16 about the pointer axis is best seen in FIGURES 3-6 of the drawings wherein there is shown a shaped bracket 43 which includes a pair of divergently extending leg members which are secured to the inner side wall 44 of the cup-shaped casing 12. Coaxial spaced holes 46 and 47 are formed in the casing side wall 44 and the bracket 43, respectively, within which holes a flanged shaft 48 is rotatably mounted. The pinion gear 32 is press-fitted to the shaft 48 in abutting relation with a large radial flange 49 formed on the shaft. A resilient sealing washer 51 on the shaft abuts the other side of the flange 49 at one side of the washer and the casing wall 44 about the hole 46 at the other side thereof to provide a moisture-proof seal thereat. The washer 51 is maintained in a compressed condition by means of a retaining ring 52 which engages a groove 53 adjacent the inner end of the shaft in abutting relation with the bracket 43. The outer end of the shaft is provided with a kerf 54, or the like, whereby the shaft and attached pinion gear 32 may be rotated by means of a screwdriver, or the like.

Figure 5:
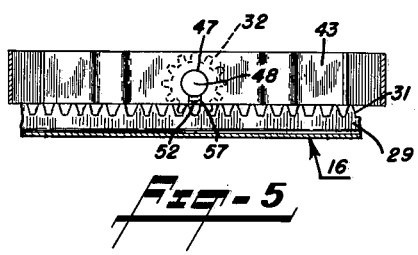
FIGURE 5 is a fragmentary sectional view taken on line 5—5 of FIGURE 4.
Figure 6:
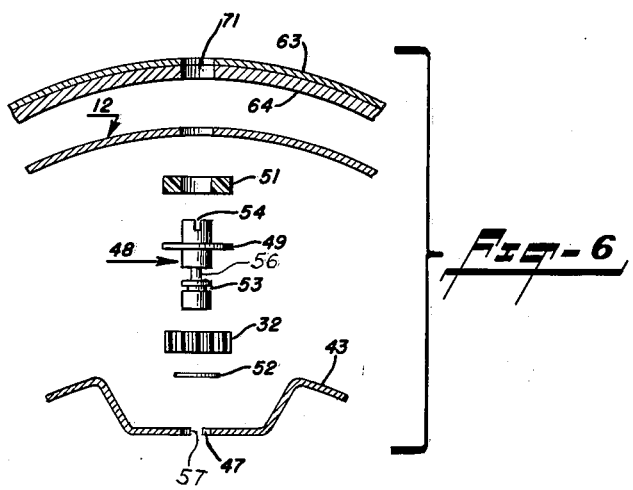
FIGURE 6 is an exploded view of the mechanism for rotating the scale plate.

In order to facilitate the assembly of the above-described dial rotating mechanism, the shaft 48 is provided with a reduced diameter portion 56 intermediate the ends thereof. As seen in FIGURE 5, a slot 57 is formed in the bracket 43 which slot extends from the mounting hole 47 to the edge of the bracket. The shaft 48 with the sealing washer 51 and pinion gear 32 thereon, is placed into operative position by passing the reduced diameter portion 56 through the slot 57 (the slot 57 being somewhat wider than the diameter of the shaft at 56) and then axially shifting the shaft outwardly to a position wherein the retaining ring 52 may be placed on the shaft.

Figure 7:
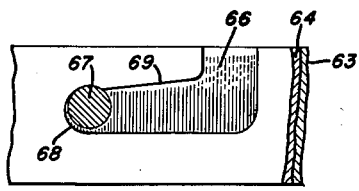
FIGURE 7 is a fragmentary sectional view taken on line 7—7 of FIGURE 3.

Referring, now, specifically to FIGURE 3, the end of the casing 12 is provided with an inturned flange 59 upon which a transparent cover 61 is positioned with a resilient sealing ring 62 located therebetween. The cover is held in place over the end of the casing by an annular clamping ring 63 which is attached to the case by bayonet-type fastening means. Referring also, to FIGURE 7, which is a sectional view taken on line 7—7 of FIGURE 3, it will be seen that a cylindrical shaped spacer member 64 is secured, as by welding, or other suitable means, to the inner wall of the clamping ring 63. Three generally L-shaped slots 66 are formed in the member 64 at 120 degree intervals, which slots are adapted to cooperate with pins 67 extending from the side of the casing 12. The slots, as seen in FIGURE 7, are provided with enlarged end portions 68 within which the pins 67 rest in final engagement of the ring on the case; the pins 67 engaging the inclined walls 69 of the slot 66 during initial engagement thereof. As seen in FIGURES 3 and 4, a hole 71 is formed in the clamping ring 63 and spacer ring 64 through which the end of the shaft 48 is accessible when the said rings are in assembled condition on the casing. It will be apparent, then, that the dial is rotatably adjustable from the side of the instrument without first disassembling the instrument.

The thermometer of our invention is easily adjusted at the factory at the time of the manufacture thereof and may be compared with a standard thermometer from time to time and readjusted, when necessary, by simply turning the shaft 48 to rotate the dial and to thereby eliminate errors in the indicated temperature. Thus, errors, due to vibration and shocks, after the thermometer has been installed, may be simply eliminated. In most prior art thermometer arrangements, the thermometer must be disassembled and/or removed from its mounting, in order to effect the necessary calibration adjustments. With the novel thermometer of our invention, calibration adjustment thereof is effected by use of a screwdriver or suitable wrench by means of which the shaft 48 and pinion 32 are rotated from the side of the instrument without even removing the cover therefrom.

Not only is the thermometer of our invention easily, initially and periodically adjusted by means of the novel rotatable dial arrangement, but the novel arrangement provides means whereby the instrument scale may be disposed in the desired reading position when mounting the thermometer to a support, or the like. Referring to FIGURE 3, it will be understood that during the installation of the thermometer in a suporting wall 76, for example, the mounting nut may be threaded tightly into a cooperating hole formed in the wall. When so tightened, however, it will be apparent that the instrument scale may not be disposed in a suitable reading position. The desired orientation of the thermometer indication is obtained by rotating the scale plate 16, in the above-described manner, to the desired position. The cover 61 is then removed from the instrument and the pointer 14 is rotated relative to the staff 19, to the proper temperature indication. Rotation of the pointer, relative to the staff, is easily accomplished by engaging the kerf 26 in the end of the staff 19 and the hub 21 with a screwdriver and, while holding the same stationary, moving the frictionally held pointer to the proper position on the scale. By utilizing frictional fastening means between the pointer and staff, and between the dial 16 and bushing 38, no inadvertent relative rotating movement may be encountered between such elements. Any play in the gear system for the rotation of the dial is of no consequence and results in no errors in the instrument calibration since the dial remains at the location to which it is adjusted.

Having now described our invention in detail, in accordance with the requirements of the patent statutes, various changes and modifications will suggest themselves to those skilled in this art. Although the invention has been described as applied specifically to a bimetallic thermometer, it will be apparent that the illustrated rotary dial and pointer arrangement is useful in connection with any device or apparatus design which includes a staff which is angularly adjusted in response to the condition of a condition response element. It is intended that such changes and modifications shall fall within the spirit and scope of the invention as recited in the following claims.

We claim:

1. An indicating system for an instrument of the type including a staff adjustable angularly by a condition-responsive element, a pointer mounted on the said staff and relatively rotatable therewith, a generally cup-shaped housing, a transparent cover secured by an annular clamping ring to the housing and closing the end thereof, the said pointer being visible through the transparent cover; the said indicating system comprising first frictional means normally retaining the said pointer against rotational displacement relative to the said staff, a relatively stationary dial rotatably mounted within the housing coaxially with the staff, second frictional means normally retaining the said dial against rotational displacement relative to the said housing, the said dial being formed with a rearwardly extending axial flange at the periphery thereof, means forming gear teeth about the entire edge of the dial flange, a bracket secured to the inside wall of the cup-shaped housing and including a portion spaced from the housing, means forming coaxial holes in the housing side wall and bracket portion spaced therefrom, means forming a slot extending from the edge of the bracket to the hole formed therein, a shaft rotatably mounted between the bracket and side wall within the said holes formed therein, a pinion gear secured to the shaft and engaged with the gear teeth on the dial, means forming a reduced diameter portion on the said shaft adapted to fit within the slot formed in the said bracket, the said shaft being slid through the slot at the reduced diameter portion during the assembly of the instrument, means forming a hole in the clamping ring cooperating with the hole formed in the side wall of the housing through which the shaft is accessible for rotation thereof in the assembled instrument.

2. An indicating system for an instrument of the type including a staff adjustable angularly by a condition-responsive element, a pointer mounted on the said staff and relatively rotatable therewith, a generally cup-shaped housing, a transparent cover secured by an annular clamping ring to the housing and closing the end thereof, the said pointer being visible through the transparent cover; the said indicating system comprising first resilient frictional means normally retaining the said pointer against rotational displacement relative to the said staff, a relatively stationary dial rotatably mounted within the housing coaxially with the staff, said dial being formed with a rearwardly extending axial flange at the periphery thereof, means forming gear teeth in the edge of the dial flange, second resilient frictional means normally retaining the said dial against rotational displacement relative to the said housing, a bracket secured to the inside wall of the cup-shaped housing and including a portion spaced from the housing, means forming coaxial holes through the housing side wall and bracket portion spaced therefrom, a shaft rotatably mounted between the bracket and side wall within the said holes formed therein, a pinion gear secured to the shaft and engaged with the gear teeth on the dial, and means forming a hole in the clamping ring cooperating with the hole formed in the side wall of the housing through which the shaft is accessible for rotation thereof in the assembled instrument.

References Cited in the file of this patent
UNITED STATES PATENTS

| | | |
|---|---|---|
| 2,246,741 | Loen | June 24, 1941 |
| 2,458,022 | Phelps | Jan. 4, 1949 |
| 2,470,482 | Gabrielson | May 17, 1949 |
| 2,706,962 | Kebbon | Apr. 26, 1955 |

FOREIGN PATENTS

| | | |
|---|---|---|
| 119,000 | Switzerland | Feb. 16, 1927 |
| 642,962 | France | Sept. 7, 1928 |
| 234,148 | Switzerland | Jan. 3, 1945 |